United States Patent [19]
Hill et al.

[11] Patent Number: 4,913,383
[45] Date of Patent: Apr. 3, 1990

[54] ADVANCED AIRCRAFT INSTRUMENTATION APPARATUS

[75] Inventors: Richard T. Hill, Marion; Roger W. Heidt, Cedar Rapids, both of Iowa

[73] Assignee: Rockwell International Corporation, El Segundo, Calif.

[21] Appl. No.: 272,155

[22] Filed: Nov. 16, 1988

[51] Int. Cl.⁴ .............................................. G12B 9/00
[52] U.S. Cl. .................................... 248/27.1; 200/296
[58] Field of Search ........................ 248/27.1, DIG. 6; 361/394, 399, 415; 200/296, 294; 439/569, 570, 573, 564

[56] References Cited

U.S. PATENT DOCUMENTS

| | | | |
|---|---|---|---|
| 1,954,391 | 4/1934 | Matson | 200/296 |
| 2,005,792 | 6/1935 | Leins | 248/27.1 X |
| 2,352,049 | 6/1944 | Weaver | 248/27.1 |
| 2,514,176 | 7/1950 | Borkowski | 248/DIG. 6 X |
| 3,329,793 | 7/1967 | Camp | 200/296 |
| 3,662,085 | 5/1972 | Robinson et al. | 439/570 X |
| 4,270,717 | 6/1981 | Upham | 248/27.1 |
| 4,569,458 | 2/1986 | Horsley | 248/27.1 X |

FOREIGN PATENT DOCUMENTS 22045 10/1958 German Democratic Rep. .................................... 439/570

OTHER PUBLICATIONS

ARINC Specification No. 408A published Dec. 15, 1976 by Aeronautical Radio Inc., 2551 Riva Road, Annapolis, Maryland 21401.

*Primary Examiner*—Ramon O. Ramirez
*Attorney, Agent, or Firm*—Gregory G. Williams; M. Lee Murrah; H. Fredrick Hamann

[57] ABSTRACT

An apparatus for installing, at the front end of an instrument panel, an aircraft instrument having a rectangular chassis. The installation occurs by advancing a screw through a corner adaptor, into the instrument. The adaptors are attached to the periphery of a rectangular hole in the instrument panel, after the instrument has been inserted therethrough, so as to create an octagonal hole as is typically found in instrument panels. The corner adaptors are made up of a first plate and a second plate having a spacer region which is slightly narrower than the thickness of the instrument panel. When a screw is inserted through the first plate and the second plate, they are held together and adhere to the instrument panel which is inserted therein.

7 Claims, 2 Drawing Sheets

ADVANCED AIRCRAFT INSTRUMENTATION APPARATUS

FIELD OF THE INVENTION

This present invention generally relates to aircraft instruments and more particularly relates to instrument panels in aircraft with panel end installation capabilities and even more particularly concerns panel end loaded aircraft instruments with rectangular viewing surfaces therein.

BACKGROUND OF THE INVENTION

For years, both the bezel and the chassis, for aircraft instrumentation, have typically been octagonal in shape. This has been the case since, many of the aircraft have utilized octagonal shaped insertion holes in the instrument panel. The octagonal shape and some beneficial aspects when the instruments were round mechanical dials. During the last several years, CRTs have frequently found their way into aircraft cockpits. The octagonal shape of the typical aircraft instrument was able to accommodate the CRT, which typically had some curvature on its edges.

While the octagonally shaped bezels and chassis have enjoyed a very extensive use in the past, they have several very serious shortcomings, especially when liquid crystal displays are used. First of all, the liquid crystal displays, by their nature, are rectangular in shape and do not best utilize the space available in an octagonal bezel. Also the use of octagonal chassis often requires circuit board modifications in order to conform to the octagonal shape.

Consequently there exists a need in aircraft instrumentation apparatus which would provide for increased utilization of the viewing space on an aircraft instrument bezel and allowing for a reduction in circuit board modifications in order to conform to an octagonal chassis.

SUMMARY OF THE INVENTION

It is an object of the present invention to provide a rectangular matrix type liquid crystal display air transport indicator with a rectangular chassis that mounts from the front end of an aircraft instrument panel having a typical octagonal bezel.

It is a feature of the present invention to provide and instrument panel with removable and replaceable corners so as to convert an octagonal hole to a rectangular hole and then back to an octagonal hole.

It is an advantage of the present invention to have an air transport indicator having a rectangular chassis which can be installed from the front end of an instrument panel which has an octagonal bezel and further having the capability of housing, in the rectangular chassis, a larger matrix type liquid crystal display.

It is another advantage of the present invention to increase the viewing area of a matrix type liquid crystal display for use in air transport indicators of the type typically having an octagonal bezel.

The present invention provides an aircraft instrument panel and air transport indicator which is designed to satisfy the aforementioned needs, produce the earlier propounded objects, include the above described features and achieve the already articulated advantages. The invention is carried in a "physically constraint-less" air transport indicator chassis and instrument panel combination, in the sense that, the physical constraints which typically arise from the use of an octagonally shaped chassis or octagonally shaped panel opening are not present. Instead, a rectangular chassis is utilized with panel end loading by having removable corners in the instrument panel hole so as to convert the octagonally shaped hole into a rectangular shaped hole.

Accordingly, the present invention provides an aircraft instrument panel and an air transport indicator combination which includes a rectangular air transport indicator chassis and an instrument panel with octagonal holes therein with the panel having corners, that are removable, so that the octagonal shape can be transformed into a rectangular hole thereby allowing for the insertion of a rectangular chassis; the corners being replaceable so that the rectangular hole can be reconfigured, by the insertion of the corners back to the original octagonal hole configuration.

BRIEF DESCRIPTION OF THE DRAWINGS

The invention may be more fully understood reading the following description of a preferred embodiment of the invention in conjunction with the appended drawings wherein.

DETAILED DESCRIPTION

Figure 1:
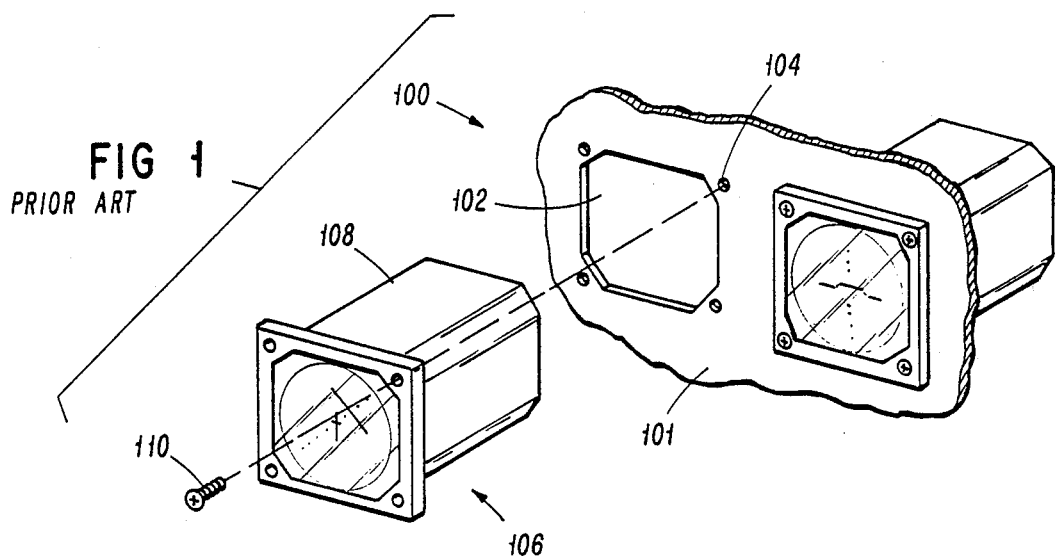
FIG. 1 is an exploded schematic representation of a typical aircraft instrument panel and air transport indicator of the prior art which clearly shows the octagonal air transport indicator chassis and panel hole.

Now referring to FIG. 1, there is shown an aircraft instrument panel and air transport indicator combination, generally designated 100, of the prior art. Instrument panel 101 is shown having octagonally shaped insertion holes 102 therein. Panel 101 having threaded screw holes 104 disposed therein. Also shown is the air transport indicator, generally designated 106 clearly having an octagonally shaped chassis 108 together with mounting screws 110. The air transport indicator 106 is similar to the description in the ARINC 408A specification, which is generally known in the industry.

Figure 2:
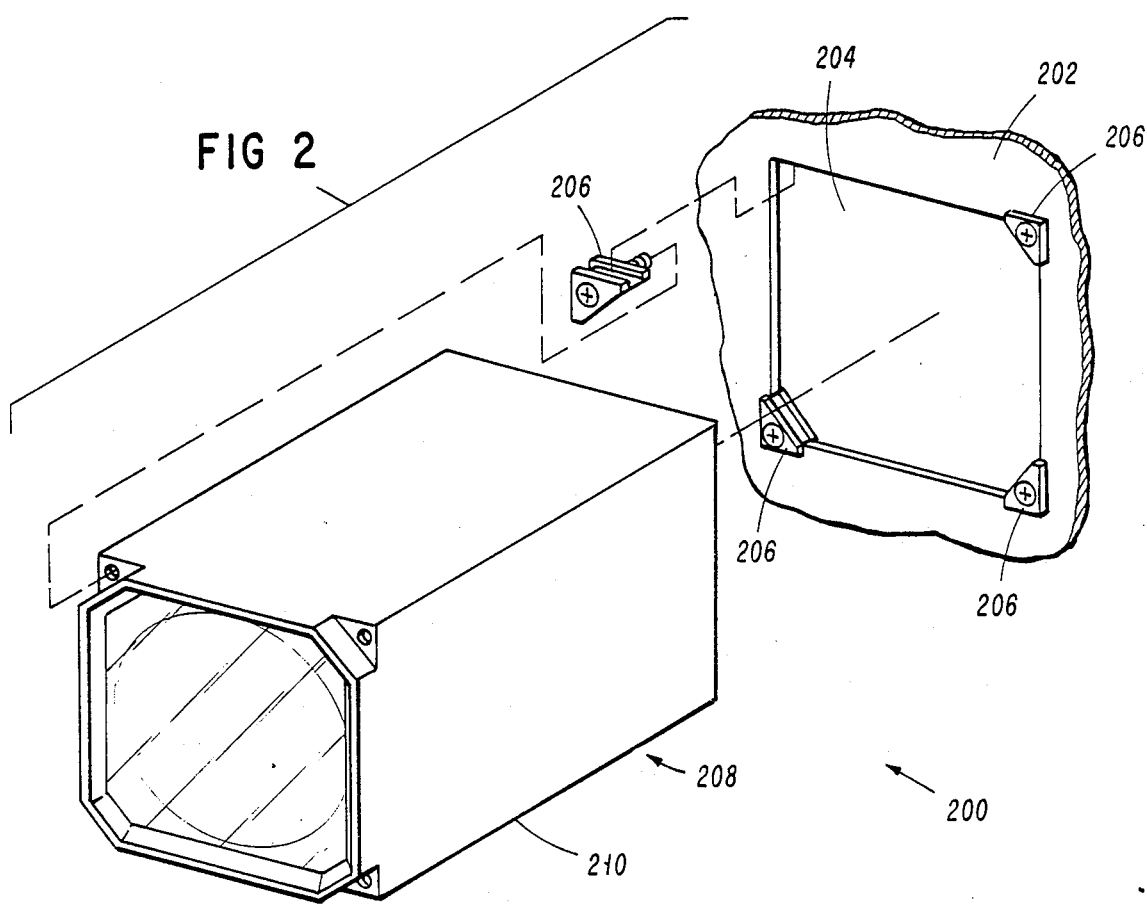
FIG. 2 is an exploded schematic representation of the aircraft instrument panel and air transport indicator and corner adapters of the present invention, which clearly shows the rectangular shaped air transport chassis and panel hole.

Now referring to FIG. 2, there is shown an aircraft instrument panel and air transport indicator combination, generally designated 200, having an aircraft instrument panel 202, with a rectangular hole 204 disposed therein. Also shown is the corner adapter assembly 206 and air transport indicator 208 having a rectangular chassis 210.

Figure 3:
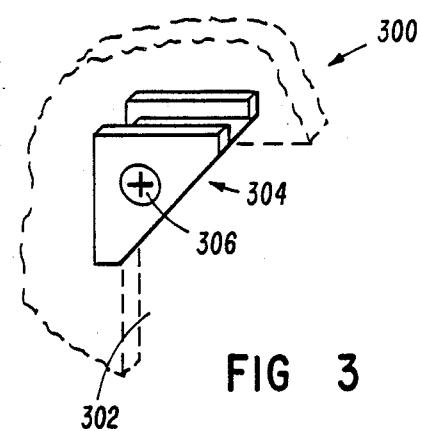
FIG. 3 is a schematic representation on the corner adapter of FIG. 2, in place in the corner of the rectangular hole.

Now referring to FIG. 3, there is shown the corner adapter assembly 304 of the present invention, inserted in the corner rectangular hole 204 of FIG. 2. Corner adapter assembly 304 is shown having a screw 306 therein. The hole 302 in panel 300 is thereby transformed from a rectangular hole to an octagonal hole, when corner adapter assemblies are inserted in each of the four corners of the rectangular hole.

Figure 4:
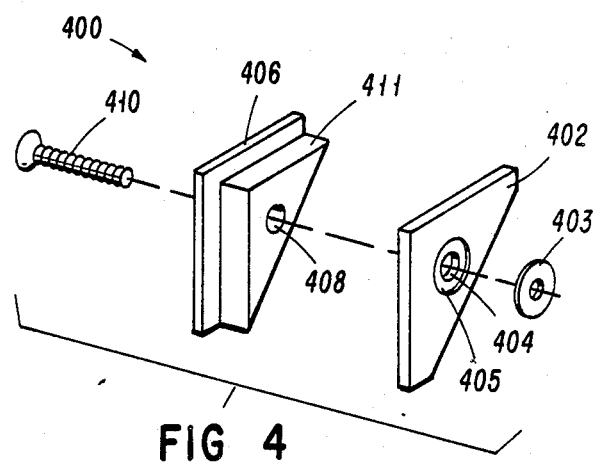
FIG. 4 is an enlarged exploded schematic representation of the corner adapter and screw combination of the present invention.

Now referring to FIG. 4, there is shown an enlarged and exploded representation of the corner adapter and screw combination of the present invention, generally designated 400, having a back plate or mounting member 402, which is preferably made of stainless steel, having a screw hole 404 therein and having a cylindrical depression 405 therein, a recessed washer 403, which is preferably made of nylon, and a front plate or instrument members or adapter means, 406, which is preferably made of stainless steel, having a screw hole 408 therethrough together with mounting screw 410. Front plate 406 is designed to have a spacer area 411, which is slightly narrower than the thickness of the panel 202 (FIG. 2) so that the corner adapter assembly adheres to the instrument panel when in place.

Figure 5:
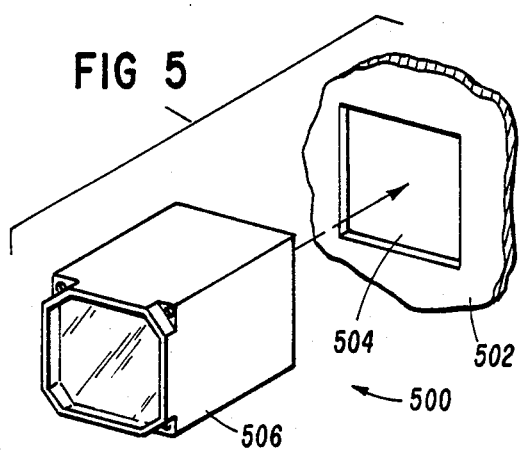
FIG. 5 is a schematic representation of a portion of the aircraft instrument panel and the air transport indicator in a position in front of the instrument panel before the installation.

Now referring to FIG. 5 there is shown a schematic representation of the air transport indicator and the aircraft instrument panel combination, of the present invention, generally designated 500, immediately before the insertion of the air transport indicator 506 into the instrument panel 502.

Figure 6:
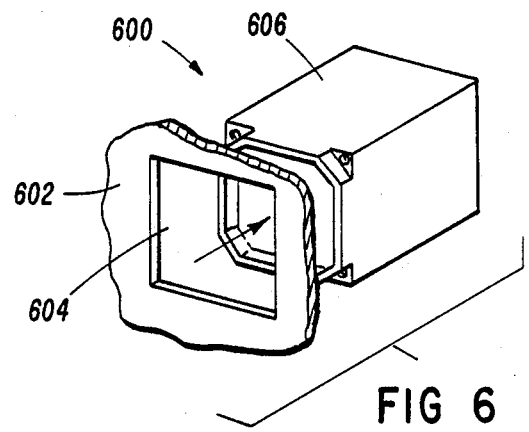
FIG. 6 is a schematic representation of the air transport indicator after its insertion through the rectangular hole of the aircraft instrument panel.

Now referring to FIG. 6, there is shown, a schematic representation of the air transport indicator and instrument panel combination, of the present invention, generally designated 600, after the air transport indicator 606 has been inserted through the hole 604 in panel 602. During installation, indicator 606 is inserted through the hole 604 and just beyond the hole so that the corner adapter assemblies can be applied to the panel 602.

Figure 7:
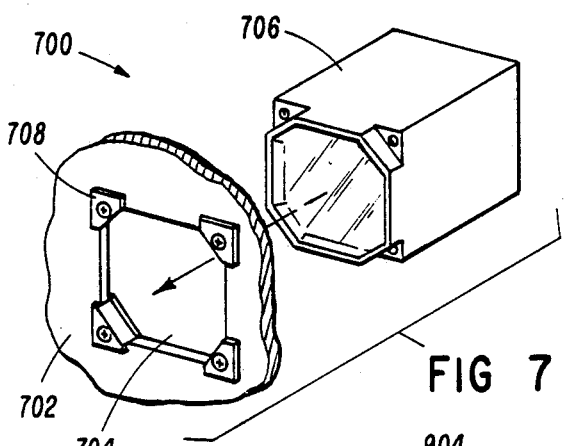
FIG. 7 is a schematic representation of the aircraft instrument panel and air transport indicator of FIG. 6 with the corner adapters in place.

Now referring to FIG. 7, there is shown, a schematic representation of the air transport indicator and instrument panel combination, of the present invention, generally designated 700, after the air transport indicator 706 has been inserted through the hole 704 of panel 702 and also after the corner adapters 708 have been attached to the corners of the hole 704 in panel 702. The installation of the corner adapters 708 effectively transforms the rectangular hole 704 into an octagonal hole.

Figure 8:
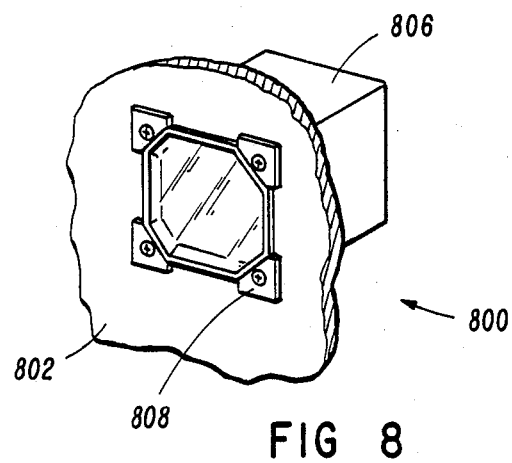
FIG. 8 is a schematic representation of the aircraft instrument panel and air transport indicator of the present invention in its completely installed state.

Now referring to FIG. 8, there is shown a schematic representation of the air transport indicator and instrument panel combination, of the present invention, generally designated 800, after the air transport indicator has been securely fastened with screws through the corner adapters 808.

Figure 9:
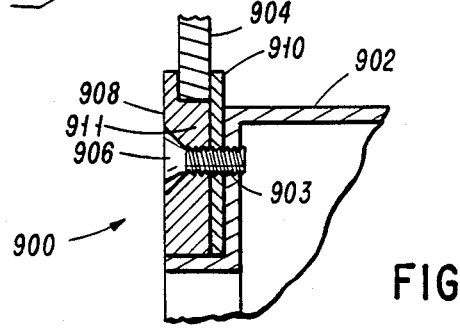
FIG. 9 is a schematic cross-sectional representation of the aircraft instrument panel with the air transport indicator installed therein, together with the corner adapter assembly of the present invention.

Now referring to FIG. 9, there is shown a schematic cross-sectional representation of the air transport indicator and instrument panel combination, of the present invention, generally designated 900 where the chassis 902 of the air transport indicator is shown having a tapped hole 903 therein for receiving a screw 906. Aircraft instrument panel 904 is shown placed between plates 908 and 910 which are being held together and attached to chassis 902 by screw 906. The front plate 908 is shown having a spacer region 911 which is slightly narrower than the thickness of the instrument panel 904. This allows for the adhesion of the corner adapter assembly to the front panel during the installation operations.

It is thought that the aircraft instrument and air transport indicator combination of the present invention and many of its attendant advantages will be understood from the foregoing description, and it will be apparent that various changes may be made in the form, construction, and the arrangement of the parts, without departing from the spirit and scope of the invention, or sacrificing all of their material advantages, the form herein being merely preferred or exemplary embodiments thereof.

We claim:

1. An aircraft instrument panel, of the type having aircraft instruments mounted therein, which have octagonally shaped bezels, the panel comprising:
    a. a planar panel member having a plurality of holes therein, for receiving aircraft instruments, at least one of said holes being rectangular in shape and thereby having four corners and being capable of receiving an aircraft instrument having a chassis with a rectangular cross-section, when the chassis is sectioned in a plane parallel to the planar panel member;
    b. a plurality of corner adapter means for insertion in the four corners of said rectangular hole so that the rectangular hole is transformed into an octagonal hole;
    c. each of said plurality of corner adapter means having a threaded hole therethrough for receiving a screw;
    d. a plurality of screws for insertion through said threaded holes and extending into said aircraft instrument;

whereby, the rectangular hole in the aircraft instrument panel is transformable into an octagonal hole.

2. A panel of claim 1 wherein the corner adapter means comprises:
    a. a first plate for attachment to the aircraft instrument;
    b. a second plate for attachment to the panel member; and
    c. a screw connecting the first plate with the second plate.

3. An apparatus for attaching an aircraft instrument having a rectangular chassis and an aircraft instrument panel having a rectangular hole therein said rectangular hole having four corners, said apparatus comprising:
    a. a plurality of mounting members detachably attached to the aircraft instrument at said corners of said rectangular hole;
    b. a plurality of adapter means detachably attached to the aircraft instrument panel, for transforming the rectangular hole therein into an octagonal hole; and
    c. a plurality of means for connecting said plurality of mounting members with said plurality of adapter means.

4. An apparatus of claim 3, wherein the plurality of mounting members comprises:
    a. a plurality of first plates, each having a cylindrical depression therein; and a plurality of flexible washers disposed in the cylindrical depression in each of the first plates.

5. An apparatus of claim 4 wherein the plurality of adapter means comprises a plurality of second plates having a spacer region therein, the spacer region being narrower than the thickness of the instrument panel.

6. An apparatus of claim 5 wherein the plurality of means for connecting comprises a plurality of screws for insertion through the plurality of mounting members and the plurality of adapter means.

7. An apparatus comprising:
 a. an aircraft instrument having a rectangular chassis;
 b. an aircraft instrument panel having a rectangular hole, with four corners, therein, for receiving said aircraft instrument;
 c. a plurality of panel mounting members detachably attached with said aircraft instrument panel, of said corners, for transforming the rectangular hole in said aircraft instrument into an octagonal hole;
 d. a plurality of mounting screws;
 e. a plurality of instrument members detachably attached with said aircraft instrument for connecting with said plurality of panel members by said mounting screws;

whereby, the aircraft instrument, having a rectangular chassis, is inserted through the rectangular hole in the aircraft instrument panel and attached to the aircraft instrument panel by the interconnection of said plurality of instrument members, said plurality of panel members and said plurality of mounting screws; thereby the rectangular hole in the aircraft instrument panel is transformed into an octagonal hole and the aircraft instrument is securely received by said aircraft instrument panel.

* * * * *